United States Patent
Yang et al.

(10) Patent No.: US 12,120,046 B2
(45) Date of Patent: Oct. 15, 2024

(54) DATA TRANSMISSION METHOD AND APPARATUS

(71) Applicant: HUAWEI TECHNOLOGIES CO., LTD., Guangdong (CN)

(72) Inventors: Bo Yang, Nanjing (CN); Peng Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 338 days.

(21) Appl. No.: 17/504,653

(22) Filed: Oct. 19, 2021

(65) Prior Publication Data
US 2022/0038226 A1    Feb. 3, 2022

Related U.S. Application Data

(63) Continuation of application No. PCT/CN2020/077381, filed on Mar. 2, 2020.

(30) Foreign Application Priority Data

Apr. 19, 2019  (CN) .......................... 201910316685.3

(51) Int. Cl.
*H04L 5/00*  (2006.01)
*H04W 72/0446*  (2023.01)
(Continued)

(52) U.S. Cl.
CPC ....... *H04L 5/0032* (2013.01); *H04W 72/0446* (2013.01); *H04W 72/27* (2023.01); *H04W 74/002* (2013.01); *H04W 74/0808* (2013.01)

(58) Field of Classification Search
CPC ............ H04L 5/0032; H04W 72/0446; H04W 72/27; H04W 74/002; H04W 74/0808; H04W 74/0816
See application file for complete search history.

(56) References Cited

U.S. PATENT DOCUMENTS

2017/0079027 A1    3/2017  Chun et al.
2017/0170932 A1*   6/2017  Chu ....................... H04L 5/0053
(Continued)

FOREIGN PATENT DOCUMENTS

CN        104168662 A    11/2014
CN        106304390 A     1/2017
(Continued)

OTHER PUBLICATIONS

PCT International Search Report and Written Opinion issued in International Application No. PCT/CN2020/077381 on May 28, 2020, 17 pages (with English translation).
(Continued)

*Primary Examiner* — Chae S Lee
(74) *Attorney, Agent, or Firm* — Fish & Richardson P.C.

(57) ABSTRACT

This application provides a data transmission method and apparatus. The method includes: A first access point detects a channel. If the first access point detects an idle first channel, the first access point sends a first trigger frame to at least one second access point, where the first trigger frame is used to trigger the at least one second access point to send data on the first channel after a first preset time period elapses. In this way, an existing CSMA channel detection mechanism may be compatible with the method, and a conflict caused by contention of a plurality of APs for a channel at the same time can be avoided, which helps improve network transmission efficiency, and helps improve transmission performance.

14 Claims, 7 Drawing Sheets

(51) Int. Cl.
*H04W 72/27* (2023.01)
*H04W 74/00* (2009.01)
*H04W 74/0808* (2024.01)

(56) References Cited

U.S. PATENT DOCUMENTS

| | | | |
|---|---|---|---|
| 2018/0184454 A1 | 6/2018 | Viger et al. | |
| 2018/0205434 A1* | 7/2018 | Cherian | H04B 7/0452 |
| 2018/0213464 A1* | 7/2018 | Jeong | H04W 12/50 |
| 2020/0015041 A1* | 1/2020 | Cariou | H04W 4/50 |
| 2020/0106579 A1* | 4/2020 | Cherian | H04W 52/38 |

FOREIGN PATENT DOCUMENTS

| | | |
|---|---|---|
| CN | 106922034 A | 7/2017 |
| CN | 108604961 A | 9/2018 |
| CN | 108924945 A | 11/2018 |
| WO | 2019005027 A1 | 1/2019 |

OTHER PUBLICATIONS

Office Action issued in Chinese Application No. 201910316685.3 on May 7, 2022, 16 pages (with English translation).

\* cited by examiner

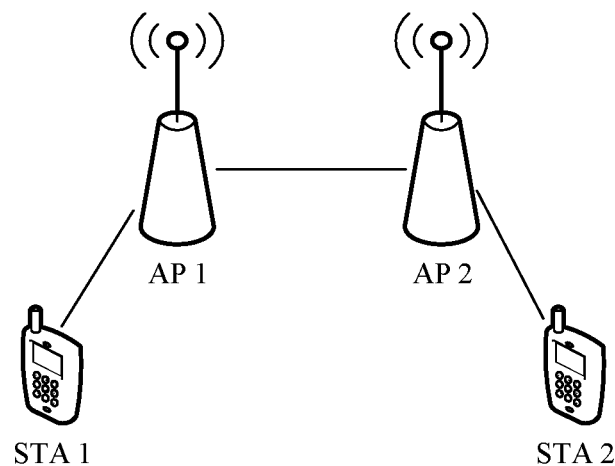
FIG. 3
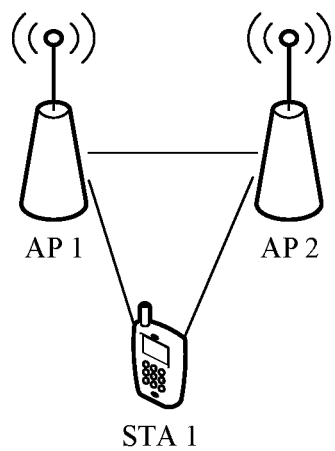
FIG. 4
| Frame control | Duration | RA | FCS |
|---|---|---|---|
| 2 | 2 | 6 | 4 |
FIG. 5

DATA TRANSMISSION METHOD AND APPARATUS

CROSS-REFERENCE TO RELATED APPLICATIONS

This application is a continuation of International Application No. PCT/CN2020/077381, filed on Mar. 2, 2020, which claims priority to Chinese Patent Application No. 201910316685.3, filed on Apr. 19, 2019. The disclosures of the aforementioned applications are hereby incorporated by reference in their entireties.

TECHNICAL FIELD

This application relates to the communication field, and more specifically, to a data transmission method and apparatus in the communication field.

BACKGROUND

In a wireless local area network (wireless local area network, WLAN), a contention manner based on a carrier sense multiple access (carrier sense multiple access, CSMA) mechanism is usually used to determine a channel to be used. In the WLAN, a frequency resource is relatively precious, and it cannot be ensured that all access points (access point, AP) are deployed on different frequency bands. Therefore, generally, adjacent channels are deployed on different frequency bands (in other words, the adjacent channels are deployed on different channels); and channels far away from each other may be deployed on a same frequency band (in other words, the channels are deployed on a same channel). As shown in FIG. 1, APs with different patterns are deployed on different channels, APs with a same pattern are deployed on a same channel, and different numbers represent different APs. An AP 1, an AP 9, an AP 17, an AP 25, an AP 5, an AP 13, an AP 21, and an AP 25 are deployed on a same frequency band; an AP 2, an AP 10, an AP 18, an AP 26, an AP 6, an AP 14, an AP 22, and an AP 30 are deployed on a same frequency band; an AP 3, an AP 11, an AP 19, an AP 27, an AP 7, an AP 15, an AP 23, and an AP 31 are deployed on a same frequency band; and an AP 4, an AP 12, an AP 20, an AP 28, an AP 8, an AP 16, an AP 24, and an AP 32 are deployed on a same frequency band. Before sending data, an AP needs to detect a channel by using the contention manner. Only when the channel is idle for a specific period of time, the AP considers that the channel is available and may send data on the available channel. The contention manner is used, consequently, a plurality of APs may contend for one channel at the same time, and a conflict may occur. As a result, some APs cannot send data. To avoid the conflict, a detection energy threshold may be set. To be specific, when energy on a channel is greater than the threshold, it indicates that the channel is occupied and data cannot be sent on the channel; and only when the energy on the channel is less than the threshold, it indicates that the channel is not occupied and data can be sent on the channel. However, because another channel interferes with an idle channel, it can also be detected that energy is greater than the threshold on the idle channel. Therefore, APs far away from each other may also fail to send data at the same time. As a result, network efficiency decreases, and transmission performance is affected.

SUMMARY

This application provides a data transmission method and apparatus, which helps improve transmission performance.

According to a first aspect, a data transmission method is provided, including: A first access point detects a channel. If the first access point detects an idle first channel, the first access point sends a first trigger frame to at least one second access point, where the first trigger frame is used to trigger the at least one second access point to send data on the first channel after a first preset time period elapses.

According to the data transmission method provided in this embodiment of this application, when detecting the idle first channel, the first access point may send the first trigger frame to the at least one second access point, and trigger, by using the first trigger frame, the at least one second access point to send data. In this way, an existing CSMA channel detection mechanism may be compatible with the method, and a conflict caused by contention of a plurality of APs for a channel at the same time can be avoided. This helps improve network transmission efficiency, and helps improve transmission performance.

In some possible implementations, the first access point and the at least one second access point are co-channel access points.

In some possible implementations, if the first access point detects the idle first channel, the first access point may send the first trigger frame to the at least one second access point on the first channel. Certainly, the first access point may not send the first trigger frame to the at least one second access point on the first channel. For example, the first access point may send the first trigger frame to the at least one second access point on a resource allocated by a controller.

In some possible implementations, the first access point may broadcast the first trigger frame to the at least one second access point.

In some possible implementations, the first access point and the at least one second access point belong to a same access point group.

In some possible implementations, any access point in the access point group and the first access point are co-channel access points.

It should be noted that all access points in a same access point group are co-channel access points. Optionally, co-channel access points may be divided into a same access point group based on a distance. For example, co-channel access points within a radius of 15 meters belong to an access point group. Optionally, co-channel access points may be divided into a same access point group based on a service type. For example, co-channel access points that process a video service belong to an access point group. An access point group may alternatively be divided based on another attribute, but access points in any access point group are co-channel access points.

Optionally, an access point group may be divided into by a network in advance before data is sent, and an access point in the access point group can learn of the access point group to which the access point belongs. An access point group is also referred to as an access point set.

In some possible implementations, the first trigger frame includes a first bit field, and a bit in the first bit field is used to identify the access point group. In this way, the at least one second access point that receives the first trigger frame may determine, based on the bit in the first bit field, that the at least one second access point and the first access point belong to the same access point group.

In some possible implementations, a receiving address (RA) field of the first trigger frame includes the first bit field, and the bit in the first bit field is used to indicate a media access control (MAC) address of the access point group.

In some possible implementations, an association identifier AID field of the first trigger frame includes the first bit field, and the bit in the first bit field is used to indicate a group identifier of the access point group.

In some possible implementations, the AID field of the first trigger frame includes at least one second bit field, and a bit in each of the at least one second bit field is used to indicate an identifier of a second access point.

In some possible implementations, the first trigger frame includes a fourth bit field, and a bit in the fourth bit field is used to indicate a type of the first trigger frame. In this way, the at least one second access point may determine, based on the bit in the fourth bit field, that the first trigger frame is used to trigger data transmission on the first channel.

In some possible implementations, the first trigger frame further includes a fifth bit field, and a bit in the fifth bit field is used to indicate a first identifier of data to be transmitted by the first access point. The method further includes: The first access point sends data on the first channel based on the first identifier after the first preset time period elapses.

In some possible implementations, the first trigger frame is a clear to send (CTS) frame, and the RA field of the first trigger frame includes the fifth bit field.

In some possible implementations, a common info field or a user info field of the first trigger frame includes the fifth bit field.

In some possible implementations, the method further includes: The first access point sends the first trigger frame to a third access point, where the first trigger frame includes a third bit field, a bit in the third bit field is used to indicate a backoff time period of the third access point, and the first access point and the at least one second access point send data on the first channel during the backoff time period.

In some possible implementations, the third access point and the first access point are access points deployed on different channels.

In some possible implementations, after that the first access point sends a first trigger frame to at least one second access point, the method further includes:

The first access point detects a channel.

If the first access point detects an idle second channel, the first access point sends a second trigger frame to a fourth access point on the second channel, where the second trigger frame is used to trigger the fourth access point to send data on the second channel after a second preset time period elapses.

In some possible implementations, the first access point and the fourth access point are co-channel access points.

According to a second aspect, a data transmission method is provided, including: A second access point receives a first trigger frame sent by a first access point, where the first trigger frame is used to trigger the second access point to send data on a first channel after a first preset time period elapses.

The second access point sends data on the first channel based on the first trigger frame after the first preset time period elapses.

In some possible implementations, the first access point and the second access point are co-channel access points.

In some possible implementations, the first access point and the second access point belong to a same access point group.

In some possible implementations, any access point in the access point group and the first access point are co-channel access points.

In some possible implementations, the first trigger frame includes a first bit field, and a bit in the first bit field is used to identify the access point group.

That the second access point sends data on the first channel based on the first trigger frame after the first preset time period elapses includes: The second access point determines, based on the bit in the first bit field in the first trigger frame, that the second access point and the first access point belong to the same access point group. The second access point sends data on the first channel after the first preset time period elapses.

In some possible implementations, a receiving address (RA) field of the first trigger frame includes the first bit field, and the bit in the first bit field is used to indicate a MAC address of the access point group.

In some possible implementations, an association identifier AID field of the first trigger frame includes the first bit field, and the bit in the first bit field is used to indicate a group identifier of the access point group.

In some possible implementations, the AID field of the first trigger frame includes a second bit field, and a bit in the second bit field is used to indicate an identifier of the second access point. Before the second access point sends data on the first channel based on the first trigger frame after the first preset time period elapses, the method includes: The second access point determines, based on the bit in the second bit field, to send data on the first channel.

In some possible implementations, the first trigger frame includes a fourth bit field, and a bit in the fourth bit field is used to indicate a type of the first trigger frame. The method further includes:

The second access point determines, based on the bit in the fourth bit field, that the first trigger frame is used to trigger the second access point to send data on the first channel after the first preset time period elapses.

In some possible implementations, the first trigger frame includes a fifth bit field, and a bit in the fifth bit field is used to indicate a first identifier of data to be transmitted by the first access point.

That the second access point sends data on the first channel based on the first trigger frame after the first preset time period elapses includes:

The second access point determines, based on the bit in the fifth bit field, a second identifier of data to be transmitted by the second access point, where a correspondence exists between the first identifier and the second identifier.

The second access point sends the data corresponding to the second identifier on the first channel after the first preset time period elapses.

In some possible implementations, the first trigger frame is a clear to send (CTS) frame, and the RA field of the first trigger frame includes the fifth bit field.

In some possible implementations, a common info field or a user info field of the first trigger frame includes the fifth bit field.

According to a third aspect, this application provides a data transmission apparatus, configured to implement the method according to the first aspect and/or any possible implementation of the first aspect. The apparatus may be a network device, may be an apparatus in a network device, or may be an apparatus that can be used together with a network device. In a design, the apparatus may include a module corresponding to performing the method/operation/step/action described in the first aspect and/or any possible implementation of the first aspect. The module may be a hardware circuit, may be software, or may be implemented by a hardware circuit in combination with software. In a design, the apparatus may include a processing unit and a transceiver unit.

According to a fourth aspect, this application provides a data transmission apparatus, configured to implement the method according to the second aspect and/or any possible implementation of the second aspect. The apparatus may be a network device, may be an apparatus in a network device, or may be an apparatus that can be used together with a network device. In a design, the apparatus may include a module corresponding to performing the method/operation/step/action described in the second aspect and/or any possible implementation of the second aspect. The module may be a hardware circuit, may be software, or may be implemented by a hardware circuit in combination with software. In a design, the apparatus may include a processing unit and a transceiver unit.

According to a fifth aspect, this application provides a data transmission apparatus. The apparatus includes a processor, configured to implement the method described in the first aspect and/or any possible implementation of the first aspect. The apparatus may further include a memory. Optionally, the memory is configured to store instructions. When executing the instructions stored in the memory, the processor may implement the method described in the first aspect and/or any possible implementation of the first aspect. The apparatus may further include a communication interface. The communication interface is used by the apparatus to communicate with another device. For example, the communication interface may be a transceiver, a circuit, a bus, a module, a pin, or another type of communication interface.

According to a sixth aspect, this application provides a data transmission apparatus. The apparatus includes a processor, configured to implement the method described in the second aspect and/or any possible implementation of the second aspect. The apparatus may further include a memory. Optionally, the memory is configured to store instructions. When executing the instructions stored in the memory, the processor may implement the method described in the second aspect and/or any possible implementation of the second aspect. The apparatus may further include a communication interface, and the communication interface is used by the apparatus to communicate with another device.

According to a seventh aspect, this application provides a data transmission system, where the system includes the apparatus provided in the third aspect and the apparatus provided in the fourth aspect; or
the system includes the apparatus provided in the fifth aspect and the apparatus provided in the sixth aspect.

According to an eighth aspect, this application provides a computer-readable storage medium. The computer-readable storage medium stores computer instructions. When the computer instructions are run on a computer, the computer is enabled to perform the method in the foregoing aspects and any possible design of the foregoing aspects.

According to a ninth aspect, this application provides a chip, including a processor. The processor is configured to perform the method in the foregoing aspects and any possible implementations of the foregoing aspects.

Optionally, the chip further includes a memory, and the memory is coupled to the processor.

Further, optionally, the chip further includes a communication interface.

According to a tenth aspect, this application provides a computer program product. The computer program product includes computer program code; and when the computer program code is run on a computer, the computer is enabled to perform the method in the foregoing aspects and any possible design of the foregoing aspects.

BRIEF DESCRIPTION OF DRAWINGS

FIG. 3 is a schematic diagram of APs and STAs according to an embodiment of this application;

FIG. 4 is another schematic diagram of APs and STAs according to an embodiment of this application;

FIG. 5 is a schematic diagram of a frame format of a CTS frame according to an embodiment of this application;

DESCRIPTION OF EMBODIMENTS

The following describes technical solutions of this application with reference to accompanying drawings.

The technical solutions in embodiments of this application may be applied to various communication systems, for example, a wireless local area network (wireless local area network, WLAN) system. Optionally, the embodiments of this application may be further applied to another system, for example, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a future 5$^{th}$ generation (5$^{th}$ generation, 5G) system, or a new radio (new radio, NR) system.

The technical solutions in the embodiments of this application may be further applied to a wireless local area network (wireless local area network, WLAN). In addition, the embodiments of this application may be applied to any protocol in the 802.11 series protocols of the International Institute of Electrical and Electronics Engineers (institute of electrical and electronics engineers, IEEE) currently used by the WLAN or any protocol in 802.11 series protocols of the IEEE in the future.

Figures 1, 2:
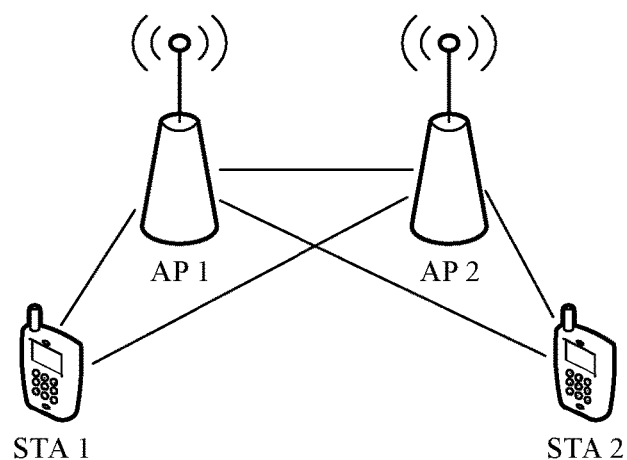
FIG. 1 is a schematic layout diagram of APs according to an embodiment of this application.
FIG. 2 is a schematic diagram of an application scenario according to an embodiment of this application.

FIG. 2 is a schematic diagram of an application scenario according to an embodiment of this application. A scenario system shown in FIG. 2 may be a WLAN system, and the WLAN system in FIG. 2 may include one or more APs and one or more STAs. An example in which there are two APs (an AP 1 and an AP 2) and two user stations (station, STA) (a STA 1 and a STA 2) in FIG. 2 is used. Wireless communication may be performed between the APs, between the APs and the STAs, and between the STAs by using various standards.

A user station (STA) may also be referred to as a system, a subscriber unit, an access terminal, a mobile station, a remote station, a remote terminal, a mobile device, a user terminal, a terminal, a wireless communication device, a user agent, a user apparatus, or user equipment (user equipment, UE). The station may be a wireless communication chip, a wireless sensor, or a wireless communication terminal. For example, the station is a mobile phone supporting a Wi-Fi communication function, a tablet computer supporting a Wi-Fi communication function, a set-top box supporting a Wi-Fi communication function, a smart television supporting a Wi-Fi communication function, a smart wearable device supporting a Wi-Fi communication function, a vehicle-mounted communication device supporting a Wi-Fi communication function, or a computer supporting a Wi-Fi communication function. Optionally, the station may be a device that complies with different versions of the 802.11 protocol in a current network system or a future network system.

In this embodiment of this application, the AP communicates with the STA by using a wireless local area network, and transmits data of the STA to a network side, or transmits data from a network side to the STA. The AP is also be referred to as a wireless access point, a hotspot, or the like. The AP is an access point used by a mobile user to access a wired network, and is mainly deployed at home, inside a building or inside a campus, and has a typical coverage radius of tens of meters to hundreds of meters. Certainly, the AP may alternatively be deployed outdoors. The AP is equivalent to a bridge that connects the wired network and a wireless network. A main function of the AP is to connect wireless network clients together, and then connect the wireless network to the Ethernet. Specifically, the AP may be a terminal device or a network device with a wireless fidelity (wireless fidelity, Wi-Fi) chip. Optionally, the AP may be the device that complies with the different versions of the 802.11 protocol in the current network system or the future network system.

Specifically, wireless communication between the AP and the STA may be performed by using a single-user multiple-input multiple-output (single-user multiple-input multiple-output, SU-MIMO) technology or a multi-user multiple-input multiple-output (multi-users multiple-input multiple-output, MU-MIMO) technology. In this embodiment of this application, each STA is equipped with one or more antennas. Each AP supports multi-site coordinated and/or joint transmission.

It should be understood that communication in this specification may be direct communication, or may be indirect communication. This is not limited in this embodiment of this application.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (compact disc, CD), a digital versatile disc (digital versatile disc, DVD)), a smart card, or a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

To implement coordinated transmission of data by a plurality of APs, in a possible implementation, a scheduled sending solution may be used. To be specific, synchronized transmission timeslots are allocated for different APs, so that adjacent APs perform transmission in different timeslots, thereby reducing interference; and concurrent transmission is implemented by APs far away from each other in a same timeslot, thereby improving transmission efficiency. In this manner, a scheduled sending mechanism is used. The scheduled sending mechanism is incompatible with an existing CSMA mechanism. In addition, the scheduled transmission manner is used, consequently, another AP or another station (station, STA) that is performing transmission is easily to be interfered.

In a possible implementation, timeslots may be allocated to co-channel APs, and each AP detects a status of a channel at a start moment of the timeslot, skips the timeslot if the channel is busy, or sends data in the timeslot if the channel is idle. Because the AP detects the status of the channel at the start moment of the timeslot, it is possible that the channel is occupied only at the start moment of the timeslot, and is idle at another moment. In this way, randomness of detecting the channel is relatively large. In addition, the channel status is detected only at the start moment of the timeslot, and the status detected at the start moment does not represent a status of the channel in the entire timeslot. It is possible that the AP 1 detects that a channel is idle at a start moment of a timeslot, but the AP 2 detects that a channel is busy at a start moment of a timeslot. Even if the AP 1 and the AP 2 are co-channel APs, only the AP 1 can send data, and the AP 2 cannot send data. As a result, transmission performance decreases. First, some concepts or terms involved in this application are briefly described.

Co-channel APs: An unlicensed industrial, scientific, and medical (industrial, scientific, and medical, ISM) frequency band is generally used by WI-FI. The frequency band includes a 2.4 G frequency band whose bandwidth is about 70 MHz, a 5 G frequency band whose bandwidth is about 200 MHz, or a frequency band in the future network system. In an actual application, APs are usually densely deployed. To avoid excessively severe interference between the APs, adjacent APs usually operate on different frequency bands, and bandwidth occupied by each AP is usually 20 M, 40 M, 80 M, or more. It is also impossible to ensure that all APs operate on different frequency bands. Therefore, an AP and another AP that have an interval of one AP or two APs operate on a same frequency band. The APs that operate on the same frequency band are referred to as co-channel APs. In this embodiment of this application, APs in a same access point group are all referred to as co-channel APs.

Coordinated transmission (coordinated transmission): Different co-channel APs send data only to a terminal device in a cell in which the APs are located, and channel reuse is performed based on the CSMA. Coordinated transmission enables the APs to exchange necessary information based on a specific algorithm and rule, so that the different co-channel APs implement controlled concurrent transmission or time-sharing transmission. Generally, cross-AP joint coding/decoding is not performed on data obtained through coordinated transmission, and data transmitted by each AP needs to be encoded only by the AP. As shown in FIG. 3, an AP 1 sends data to a STA 1, and an AP 2 sends data to a STA 2. The AP 1 and the AP 2 may exchange information, to implement coordinated transmission. As shown in FIG. 4, both an AP 1 and an AP 2 may send data to a STA 1, the AP 1 needs to perform coding only on the AP 1, the AP 2 needs to perform coding only on the AP 2, and the AP 1 and the AP 2 may exchange information, to implement coordinated transmission.

Joint transmission (joint transmission): Similar to coordinated transmission, co-channel APs implement controlled concurrent transmission during joint transmission. A difference between joint transmission and coordinated transmission is in that data sent by APs participating in joint sending needs to be jointly encoded, and a receive end can perform decoding only after receiving signals from a plurality of transmit ends. As shown in FIG. 4, both the AP 1 and the AP 2 may send data to the STA 1, and the AP 1 and the AP 2 need to perform joint coding on the data, and the AP 1 and the AP 2 may exchange information, to implement joint transmission. As shown in FIG. 2, both the AP 1 and the AP 2 may send data to the STA 1. In addition, the AP 1 and the AP 2 need to perform joint coding on data and then send data to the STA 1. Both the AP 1 and the AP 2 may send data to the STA 2. In addition, the AP 1 and the AP 2 need to perform joint coding on data and then send data to the STA 2. In this way, joint transmission may be implemented.

A format of a clear to send (clear to send, CTS) frame is shown in FIG. 5. A 2-byte frame control (frame control) field describes the format of the frame, including a protocol version, a frame type, and necessary control information (whether the frame is segmented, is encrypted, needs to perform power control, or the like), a 2-byte duration (duration) field indicates a time period of occupying a channel, a 6-byte receiving address (receiving, RA) field indicates a destination address of the CTS frame, and a 4-byte frame check sequence (frame check sequence, FCS) field is used for check. The 802.11 standard defines two types of CTS frames based on different receiving addresses (receiving address, RA) of the CTS frames. One type is a response frame of a request to send transmit (receive to send, RTS) frame, which is referred to as a CTS frame. A STA sends the RTS frame to an AP, where a source address of the RTS frame is an address of the STA, and a destination address of the RTS frame is an address of the AP. The AP returns the CTS frame to the STA, a destination address of the CTS frame is the address of the STA (in other words, the destination address of the CTS frame is the address of the STA), in other words, an RA is the address of the STA. The other type is a CTS frame sent by an AP to a STA, and a destination address of the CTS frame is an address of the AP, in other words, an RA is the address of the AP.

Figure 6:
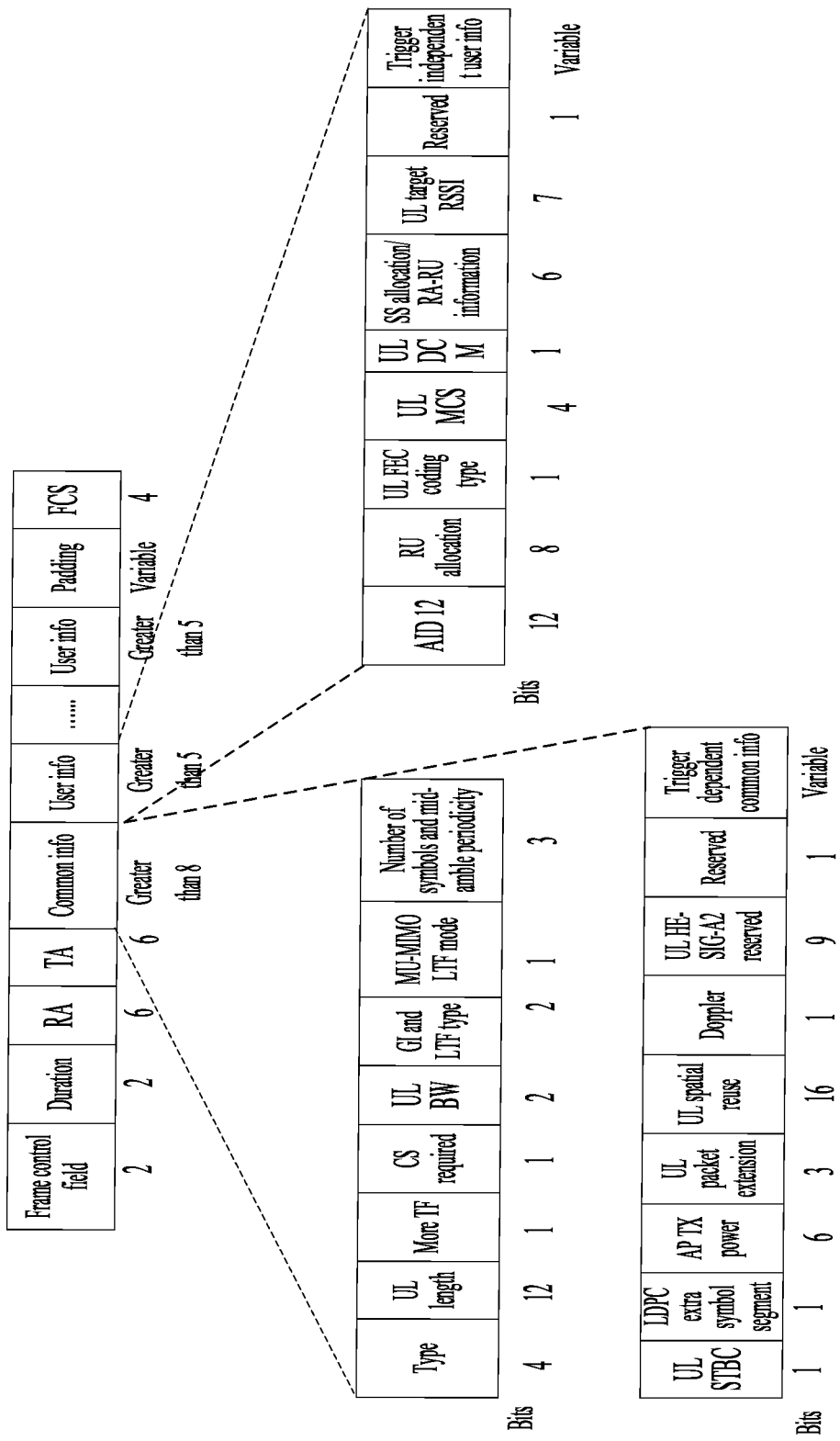
FIG. 6 is a schematic diagram of a frame format of a trigger frame according to an embodiment of this application.

A trigger (trigger) frame is a frame sent by an access point to a station. A frame format of the trigger frame is shown in FIG. 6. A 2-byte frame control (frame control) field describes a format of the frame, including a protocol version, a frame type, and necessary control information (whether the frame is segmented, is encrypted, needs to perform power control, or the like). A 2-byte duration (duration) field indicates a time period of occupying a channel. A 6-byte RA field indicates a destination address of the trigger frame, which is generally a broadcast address of a STA. A 6-byte transmitting address (transmitting address, TA) field indicates a transmitting address of the trigger frame, namely, a source address of the trigger frame. The trigger frame further includes a common info (common info) field greater than or equal to 8 bytes, a user info (user info) field greater than or equal to 5 bytes, a padding (padding) field of several bytes, and a frame check sequence (frame check sequence, FCS) field of four bytes. If the trigger frame is sent to a plurality of STAs, there may be a plurality of user info fields, and each STA corresponds to one user info field.

As shown in FIG. 6, the common info field includes a 4-bit trigger type (trigger type) field, where the trigger type field indicates a type of a current trigger frame, and different values of the trigger type field indicate different trigger frames for different functions; a 12-bit uplink (uplink, UL) length (length) subfield, where the UL length field indicates a length of a presentation protocol data unit (presentation protocol data unit, PPDU) to be sent; a 2-bit uplink bandwidth (uplink bandwidth, UL BW) field, where the UL BW field indicates bandwidth for sending uplink data by a STA that receives the trigger frame; and a 32-bit trigger dependent common info (trigger dependent common info) field, where the trigger dependent common info field indicates different meanings based on different values of the trigger type field. Other fields indicate different meanings based on different types of the trigger frame. For details, refer to descriptions in the 802.11 standard.

As shown in FIG. 6, the user info field includes a 12-bit association identifier (association identifier, AID) field, used to indicate an identifier of a STA, and the like. For details, refer to descriptions in the 802.11 standard. The user info field further includes a several-bit trigger dependent user info (trigger dependent user info) field and other fields. For details about the other fields, refer to descriptions in the 802.11 standard.

Figure 7:
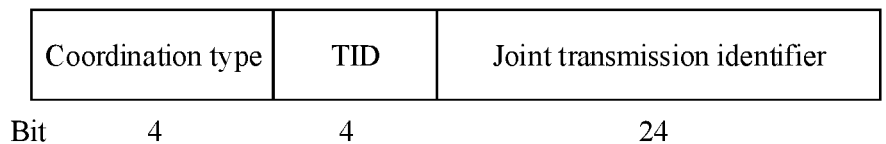
FIG. 7 is a schematic diagram of a common info field according to an embodiment of this application.

As shown in FIG. 7, the 32-bit trigger independent common info field of the common info field or the 32-bit trigger independent user info field of the user info field includes a 4-bit coordination type field, a 4-bit traffic identifier (traffic identifier, TID), and a 24-bit joint transmission ID (coordination/joint transmission ID) field. A bit in the 4-bit TID field indicates a priority of a transmitted service, and a bit in the 24-bit joint transmission ID field is used to identify data to be transmitted. For example, definition of the bit in the 4-bit coordination type field may be as follows: 0000 indicates coordinated spatial reuse (coordinated spatial reuse), 0001 indicates coordinated orthogonal frequency division multiple access (coordinated orthogonal frequency division multiple access), 0002 indicates coordinated beamforming (coordinated beamforming), 0003 indicates coordinated handover (coordinated handover), 0004 indicates distributed multiple-input multiple-output (distributed MIMO), and 0005 to 1111 indicates reserved bits.

The following specifically describes a data transmission method provided in the embodiments of this application with reference to the accompanying drawings.

Figure 8:
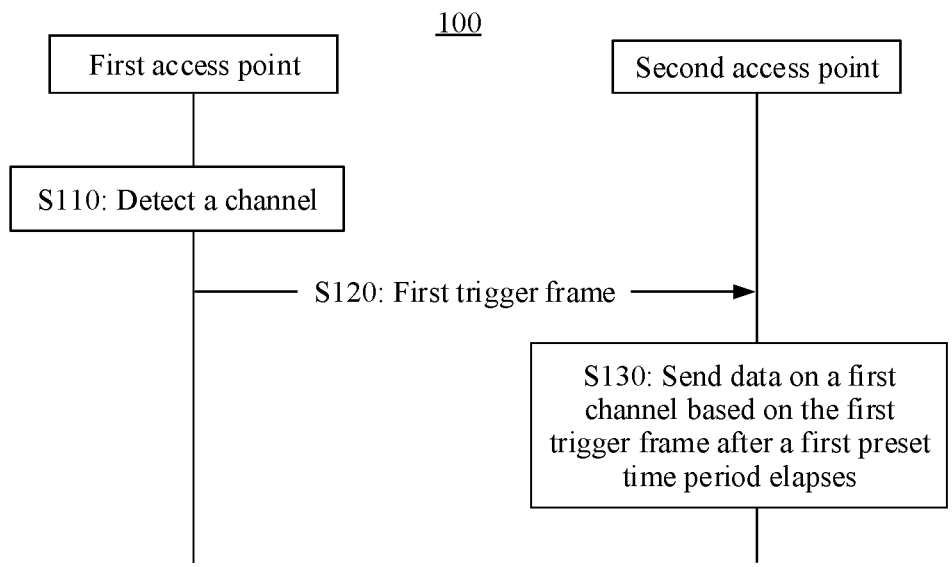
FIG. 8 is a schematic diagram of a data transmission method according to an embodiment of this application.

FIG. 8 shows a data transmission method 100 according to an embodiment of this application. The method 100 includes the following steps.

S110: A first access point detects a channel.

S120: If the first access point detects an idle first channel, the first access point sends a first trigger frame to at least one second access point, and the at least one second access point receives the first trigger frame sent by the first access point, where the first trigger frame is used to trigger the at least one second access point to send data on the first channel after a first preset time period elapses.

Optionally, the first access point and the at least one second access point are co-channel access points.

Optionally, the first preset time period may be a time period specified in the protocol. This is not limited in this embodiment of this application. For example, the first preset time period may be a short interframe space (short interframe space, SIFS). The following uses only one second access point as an example for description.

S130: After the second access point receives the first trigger frame sent by the first access point, the second access point sends data on the first channel based on the first trigger frame after the first preset time period elapses.

Optionally, the first access point and the at least one second access point belong to a same access point group. Optionally, any access point in the access point group and the first access point are co-channel access points.

Optionally, the first access point may send the first trigger frame to the at least one second access point on the first channel, and the at least one second access point may send data on the first channel on which the first trigger frame is received. Optionally, the first access point may not send the first trigger frame to the at least one second access point on the first channel. For example, the first access point may send the first trigger frame to the at least one second access point on a preset resource or a resource allocated by a controller, where a correspondence exists between the preset resource or the resource allocated by the controller and the first channel. The correspondence is used to indicate a relationship between the preset resource or the resource allocated by the controller and the idle channel. If the at least one second access point receives the first trigger frame on the preset resource or the resource allocated by the controller, the at least one second access point may determine the idle first channel based on the correspondence, to send data on the first channel. For example, a correspondence indicates that a resource 1 corresponds to a channel 1, and a resource 2 corresponds to a channel 2. If the first access point sends the first trigger frame on the resource 1, and after receiving the first trigger frame on the resource 1, the second access point determines, based on the correspondence, that the channel 1 is the idle first channel, the second access point may send data on the channel 1. If the first access point sends the first trigger frame on the resource 2, and after receiving the first trigger frame on the resource 2, the second access point determines, based on the correspondence, that the channel 2 is the idle first channel, the second access point may send data on the channel 2.

It should be noted that all access points in a same access point group are co-channel access points. Optionally, co-channel access points may be divided into a same access point group based on a distance. For example, co-channel access points within a radius of 15 meters belong to an access point group. Optionally, co-channel access points may be divided into a same access point group based on a service type. For example, co-channel access points that process a video service belong to an access point group. An access point group may alternatively be divided based on another attribute, but access points in any access point group are co-channel access points.

It should be noted that a frame format of the first trigger frame described in this embodiment of this application may be a frame format of the CTS frame, or may be a frame format of the trigger frame. Certainly, the frame format of the first trigger frame may alternatively be a newly defined frame format. The frame format of the first trigger frame is not limited in this embodiment of this application. Any frame that can implement a function of triggering the at least one second access point to send data on the first channel after the first preset time period elapses may be referred to as a first trigger frame.

It should also be noted that the second access point may also perform the method 100, in other words, any access point in the access point group may detect a channel. When an idle channel is detected, the access point may send the first trigger frame. In this way, after receiving the first trigger frame, another access point in the access group stops detecting a channel and sends data on the channel after the first preset time period elapses. In other words, in this embodiment of this application, the first access point in the access point group may detect the idle channel and send the first trigger frame to another access point in the access point group. Alternatively, each access point in the access point group may detect the idle channel, and an access point that first detects the idle channel sends the first trigger frame to another access point, and the another access point stops detecting a channel after receiving the first trigger frame, and sends data on the idle channel based on the first trigger frame after the first preset time period elapses.

Therefore, in this embodiment of this application, a specific access point or all access points in co-channel access points detect a channel, and an access point that first detects an idle channel may send the first trigger frame to another access point in the co-channel access points, to trigger the another access point to coordinately send data. In this way, an existing CSMA channel detection mechanism can be compatible with the method, and a conflict caused by contention of a plurality of APs for a channel at the same time can be avoided. This helps improve network transmission efficiency, and improve transmission performance.

Optionally, the first trigger frame may include several bit fields, and bits in the several bit fields indicate different meanings. For example, the first trigger frame may include at least one of the following bit fields: a first bit field, one or more second bit fields, a third bit field, a fourth bit field, and a fifth bit field. In other words, the first trigger frame may include one or more bit fields in the five bit fields. For example, the first trigger frame may include only the first bit field and the fourth bit field.

A bit in the first bit field is used to identify the access point group. An access point that receives the first trigger frame may determine, based on the bit in the first bit field, that the access point belongs to the access point group. For example, the bit in the first bit field is used to indicate a media access control (media access control, MAC) address of the access point group. For another example, the bit in the first bit field is used to indicate a group identifier of the access point group, where the group identifier is a group ID. In this way, the second access point that receives the first trigger frame may determine, based on a group identifier stored by the second access point and the group identifier indicated by the bit in the first bit field, that the second access point belongs to the access point group.

An access point group may be divided into by a network in advance. An access point in the access point group stores a group identifier of the access point group. When receiving the first trigger frame, the access point in the access point group determines, based on the bit in the first bit field in the first trigger frame, that the access point belongs to the access point group. Therefore, the access point in the access point group may determine that the first trigger frame is a trigger frame sent to the access point in the access point group. In this way, the first trigger frame may trigger the access point in the access point group to perform joint transmission or coordinated transmission. For example, two access point groups are divided into as an access point group 1 and an access point group 2 in advance, group identifiers of the access point group 1 and the access point group 2 are respectively an identifier 1 and an identifier 2, the access point group 1 includes an access point 1 and an access point 2, the access point group 2 includes an access point 3 and an access point 4, the access point 1 and the access point 2 store the identifier 1, and the access point 3 and the access point 4 store the identifier 2. The access point 1 broadcasts a trigger frame 1, and the access point 2 in the access point group 1 receives the trigger frame 1, where a bit in a first bit included in the trigger frame 1 is the identifier 1. The access point 2 determines, based on the bit in the first bit, that the access point 2 belongs to the access point group 1. The access point 2 may determine that the trigger frame 1 is a trigger frame sent to the access point 2, and the access point 2 needs to perform joint or coordinated data transmission with the access point 1 in the access point group 1. The access point 3 in the access point group 2 also receives the trigger frame 1. The access point 3 determines that a group identifier in the first bit field in the trigger frame 1 is the identifier 1, and the identifier 1 is different from the group identifier 2 stored in the access point 3. Therefore, the access point 3 determines that the access point 3 does not belong to the access point group 1, and may determine that the trigger frame 1 is not a trigger frame sent to the access point 3. The access point 3 does not need to perform joint or coordinated transmission with the access point 1 in the access point group 1.

A bit in each of the one or more second bit fields is used to indicate an identifier of a second access point. For example, the bit in the second bit field may be an identifier (identifier, ID) of the second access point. If there are N second access points in an access point group, the first trigger frame may include N second bit fields, and a bit in each of the second bit fields is used to identify a second access point. In this way, after receiving the first trigger frame, any second access point determines whether an identifier of the second access point exists in the second bit field. If the identifier of the second access point exists, the second access point may determine that the second access point needs to perform joint or coordinated data transmission with the first access point.

A bit in the fourth bit field is used to indicate a type of the first trigger frame. In this way, after receiving the first trigger frame, each second access point may determine, based on the bit in the fourth bit field, that the first trigger frame is used to trigger the second access point to send data on the first channel after the first preset time period elapses.

A bit in the fifth bit field is used to indicate a first identifier of data to be transmitted by the first access point, the first identifier corresponds to a second identifier, and the second identifier is used to identify data to be transmitted by the second access point. In other words, there is a preset correspondence between the data to be transmitted by the first access point and the data to be transmitted by the second access point. After receiving the first trigger frame, each second access point may determine, based on the bit in the fifth bit field, the data to be transmitted by the first access point, and determine, based on the preset correspondence and the data to be transmitted by the first access point, the data to be transmitted by the second access point. In this way, after the preset first time period elapses, each second access point may send data on the first channel.

A bit in the third bit field is used to indicate a backoff time period of a third access point that receives the first trigger frame, the third access point is not an access point in the access point group, and the third access point and an access point in the access point group may be access points deployed on different channels. The first access point broadcasts the first trigger frame, and access points that can receive the first trigger frame are classified into two types. One type is an access point in the same access point group with the first access point, and the other type is an access point that is not in the access point group with the first access point. There may be a plurality of third access points herein. In this way, the first trigger frame triggers the access point in the same access point group with the first access point to transmit data. When receiving the first trigger frame, the third access point that is not in the access point group with the first access point does not occupy the first channel and does not send data on the first channel based on the backoff time period indicated by the bit in the third bit field; and the first access point and the second access point in the access point group perform coordinated transmission or joint transmission on the first channel during the backoff time period.

It should be noted that the five bit fields are merely examples. The first trigger frame is not limited to including one or more of the five bit fields. The first trigger frame further includes another bit field in addition to the five bit fields. This is not limited in this embodiment of this application.

It should also be noted that names of the several bit fields included in the first trigger frame are not limited, and names of the fields in the existing frame or names of newly defined fields may be used. The first bit field, the second bit field, the third bit field, the fourth bit field, and the fifth bit field are merely abbreviations. In a specific implementation process, different names may be used. This is not limited in this embodiment of this application.

The following describes the five bit fields by using examples in three cases.

Figure 9:
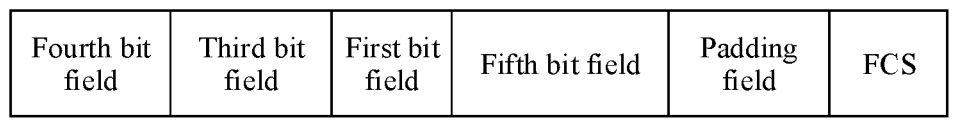
FIG. 9 is a schematic diagram of a frame format of a trigger frame according to an embodiment of this application.

Case 1: The first trigger frame may be a customized frame. For example, a format of the customized frame is shown in FIG. 9, and includes one or more of the first bit field, the third bit field, the fourth bit field, and the fifth bit field. Optionally, the first trigger frame further includes a padding (padding) field and an FCS field. A quantity of bits in each field may be determined based on a requirement. This is not limited in this embodiment of this application. In addition, FIG. 9 is merely an example for description, but should not have any limitation on this embodiment of this application.

Figure 10:
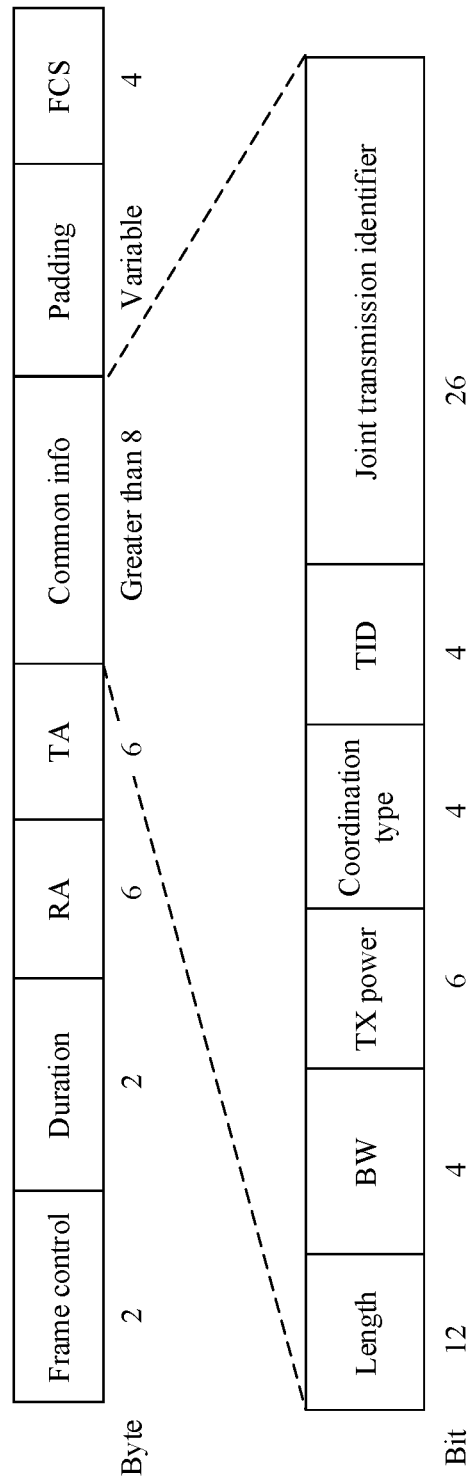
FIG. 10 is a schematic diagram of another frame format of a trigger frame according to an embodiment of this application.

For another example, the frame format of the customized first trigger frame is shown in FIG. 10, and includes a 2-byte frame control field, a 2-byte duration field, a 6-byte RA field, a 6-byte TA field, a common info field greater than 8 bytes, a padding field of several bytes, and a 4-byte FCS field. The common info field greater than 8 bytes includes a 12-bit length field, a 4-bit BW field, a 6-bit TX power field, a 4-bit coordination type field, a 4-bit TID field, and a 26-bit joint transmission identifier field. The RA field of the first trigger frame includes the first bit field, the frame control field of the first trigger frame includes the fourth bit field, the joint transmission identifier field of the first trigger frame includes the fifth bit field, and the duration field of the first trigger frame includes the third bit field. For example, definition of bits in the 4-bit coordination type field may be as follows: 0000 indicates coordinated spatial reuse, 0001 indicates coordinated orthogonal frequency division multiple access, 0002 indicates coordinated beamforming, 0003 indicates coordinated handover, and 0004 indicates distributed multiple-input multiple-output, 0005 to 1111 indicates reserved bits.

In a possible implementation, in the example in FIG. 10, a bit in the TA field is used to indicate a MAC address of the first access point, and a bit in the RA field is used to indicate a MAC group address of the access point group. A bit in the length field is used to indicate a length of data on which the second access point that receives the first trigger frame performs joint or coordinated transmission. A bit in the BW field is used to indicate bandwidth for joint or coordinated transmission by an access point in the access point group. A bit in the TX power field is used to indicate power used by the second access point that receives the first trigger frame to send data. A bit in the TID field is used to indicate a priority of data on which the first access point performs joint or coordinated transmission. A bit in the joint transmission identifier field is used to indicate an identifier of data on which the first access point and the second access point perform joint or coordinated transmission. Specifically, a quantity of bits occupied by each field may be determined based on a requirement. FIG. 10 is merely an example of a quantity of bits occupied by each field. This is not limited in this embodiment of this application.

In the case 1, each access point in the access point group further stores a MAC group address of an access point group in addition to the MAC address of the access point. In this way, after receiving the first trigger frame, each access point may determine, based on the MAC group address of the access point group in the first bit field, that the access point belongs to the access point group. Therefore, joint or coordinated transmission can be implemented by the access points in the access point group.

Figure 11:
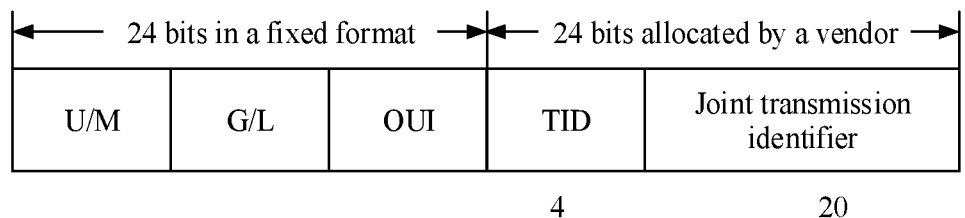
FIG. 11 is a schematic diagram of an RA field according to an embodiment of this application.

Case 2: The first trigger frame may be the CTS frame. In other words, a frame format of the first trigger frame may be similar to a frame format of the CTS frame. For example, as shown in FIG. 5, the RA field includes the first bit field. Optionally, as shown in FIG. 5, the RA field further includes the fifth bit field. If the RA field includes both the first bit field and the fifth bit field, for example, as shown in FIG. 11, the RA field of the first trigger frame includes 24 bits in a fixed format and 24 bits allocated by a vendor. The bit in the first bit field indicates that the MAC group address of the access point group occupies the front 24 bits in the fixed format. The fifth bit field is a joint transmission identifier field, and a bit in the joint transmission identifier field indicates that the first identifier of the data to be transmitted by the first access point occupies the last 20 bits allocated by the vendor. A bit in a TID field may occupy the first four bits allocated by the vendor. The MAC group address includes a unicast/broadcast (unicast/multicast, U/M) address, a globally unique or locally unique (global/local, G/L) identifier, and an organizationally unique identifier (organizationally unique identifier, QUI).

Optionally, the frame control field of the CTS frame includes the fourth bit field.

Optionally, in case 2, the bit in the duration field of the CTS frame shown in FIG. 5 is used to indicate the length of the data on which the second access point that receives the CTS frame and the first access point perform joint and coordinated transmission.

In this way, the CTS frame may be reused, and a specific field may be reused as the first bit field, the fourth bit field and/or the fifth bit field in this embodiment of this application. An access point that receives the first trigger frame may determine, based on the first bit field, that the access point belongs to the access point group with the first access point; may determine, based on the fourth bit field, that the first trigger frame is used to trigger joint or coordinated data transmission with the first access point; and may determine, based on the fifth bit field, data to be transmitted.

Case 3: The first trigger frame may be the trigger frame. In other words, a frame format of the first trigger frame may be similar to a frame format of the trigger frame.

In case 3, three cases, namely, (a), (b) and (c) may be divided for discussion.

(a). The RA field of the first trigger frame in FIG. 6 includes the first bit field. The bit in the first bit field indicates the MAC group address of the access point group. In this way, the access point that receives the first trigger frame may determine, based on the MAC group address in the first bit field, that the access point belongs to the access point group.

In (a), each access point in the access point group further stores the MAC group address of the access point group in addition to the MAC address of the access point. In this way, after receiving the first trigger frame, each access point may determine, based on the MAC group address of the access point group in the first bit field, that the access point belongs to the access point group. Therefore, joint or coordinated transmission can be implemented by the access points in the access point group.

(b) The group identifier of the access point group, namely, the group ID, is in the AID field of the first trigger frame in FIG. 6. Each access point in the access point group further stores the group identifier of the access point group in addition to the ID of the access point. In this way, after receiving the first trigger frame, each access point may determine, based on the group identifier of the access point group in the first bit field, that the access point belongs to the access point group. Therefore, joint or coordinated transmission can be implemented by the access points in the access point group.

Optionally, in (b), the RA of the first trigger frame in FIG. 6 is a broadcast address of the access point.

(c) The AID field of the first trigger frame in FIG. 6 includes the one or more second bit fields, and the bit in each of the one or more second bit fields is used to indicate the identifier of the second access point. In other words, if the access point group includes N access points, the first trigger frame includes N AID fields, and a bit in each AID field is used to identify a second access point. In this way, the N AID fields may identify the N second access points. In this way, after receiving the first trigger frame, the any second access point in the access point group determines whether the identifier of the second access point exists in the second bit field. If the identifier of the second access point exists, the second access point may determine that the second access point needs to perform joint or coordinated data transmission with the first access point. Therefore, joint or coordinated transmission can be implemented by the access points in the access point group.

Optionally, in (c), the RA of the first trigger frame in FIG. 6 is the broadcast address of the access point.

It should be noted that in any one of the three cases (a), (b), and (c), the frame format of the first trigger frame needs to enable that after receiving the first trigger frame, an access point in the access point group may determine, based on some specific fields in the first trigger frame, that the access point is an access point in the access point group. In specific implementation, there may be one or more of the three cases (a), (b), and (c).

In case 3, optionally, the type field of the first trigger frame may further include the fourth bit field. For example, the bit in the type field included in the common info field shown in FIG. 6 is used to indicate the type of the first trigger frame.

In case 3, optionally, the user info field or the common info field of the first trigger frame includes the fifth bit field. For example, as shown in FIG. 7, the joint transmission identifier field in the trigger independent common info subfield in the common info field of the first trigger frame includes the fifth bit field; or the joint transmission identifier field in the trigger independent user info subfield in the user info field of the first trigger frame includes the fifth bit field.

In case 3, optionally, the duration field of the first trigger frame includes the third bit field. For example, the duration field shown in FIG. 6 includes the third bit field, the bit in the duration field is used to indicate the backoff time period of the third access point that receives the first trigger frame, the third access point is not the access point in the access point group, and the third access point and the access point in the access point group are the access points deployed on different channels.

In case 3, optionally, the bit in the UL BW field of the first trigger frame is used to indicate the bandwidth for joint or coordinated transmission by the access points in the access point group.

In this way, the trigger frame may be reused, and a specific field may be reused as the first bit field, the second bit field, the fourth bit field, the fifth bit field, and/or the third bit field in this embodiment of this application. An access point that receives the first trigger frame and belongs to the access point group may determine, based on the first bit field or the second bit field, that the access point belongs to the access point group; determine, based on the fourth bit field, that the first trigger frame is used to trigger joint or coordinated data transmission with the first access point; and determine, based on the fifth bit field, the data to be transmitted. For an access point that receives the first trigger frame but does not belong to the access point group, a backoff time period may be set on the first channel based on the bit in the third bit field. The access point does not occupy the first channel, and another access point in the access point group performs joint or coordinated transmission on the first channel during the backoff time period.

It should be noted that, in this embodiment of this application, an A field of the first trigger frame includes a B field. It may be understood that the B field is a part of the A field, or the A field is equivalent to the B field.

The foregoing description indicates that the access points in the access point group may implement joint or coordinated transmission by using the trigger frame. However, this embodiment of this application is not limited to joint or coordinated transmission. For example, time-sharing transmission may also be implemented. Specifically, the at least one second access point in the method 100 may be a second access point. To be specific, after S110 to S130 are performed, the method further includes: The first access point continues to detect a channel. If the first access point detects an idle second channel, the first access point sends a second trigger frame to a fourth access point on the second channel, where the second trigger frame is used to trigger the fourth access point to send data on the second channel after a second preset time period elapses. The first access point and the fourth access point are co-channel access points. In this way, the first access point may trigger, by using the first trigger frame, the second access point to transmit data after the first preset time period elapses. After the second access point completes transmitting data, the first access point may send the second trigger frame to the fourth access point, to trigger the fourth access point to transmit data after the second preset time period elapses. In this way, time-sharing transmission between the second access point and the fourth access point may be implemented. Optionally, the first access point may not perform joint or coordinated transmission with the fourth access point, in other words, the first access point and the fourth access point perform independent transmission. The first access point may be used as a control node, to control co-channel access points to perform time-sharing transmission. Optionally, the first access point may also trigger, by using the second trigger frame, joint or coordinated transmission with the fourth access point.

Optionally, in a time-sharing transmission manner, there may be no access point group, in other words, the second trigger frame does not include the first bit field. Specifically, the second trigger frame may not include a group address of the access point group, for example, does not include the MAC group address of the access point group. Alternatively, the second trigger frame does not include the group identifier of the access point group. An RA field in the second trigger frame is a unicast address.

The data transmission method provided in the embodiments of this application is described in detail above with reference to FIG. 1 to FIG. 11. A data transmission apparatus provided in the embodiments of this application is described in detail below with reference to FIG. 12 to FIG. 14.

Figure 12:
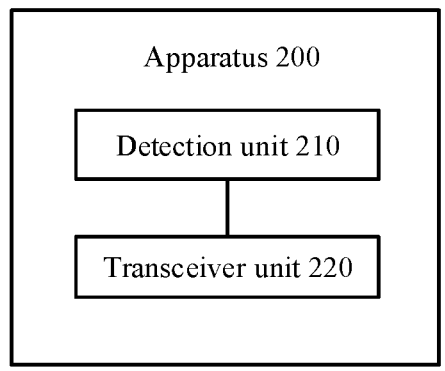
FIG. 12 is a schematic block diagram of a data transmission apparatus according to an embodiment of this application.

FIG. 12 is a schematic block diagram of a data transmission apparatus 200 according to an embodiment of this application. The apparatus 200 may correspond to the first access point described in the foregoing method, or may correspond to a chip or a component of the first access point. In addition, each module or unit in the apparatus 200 may be separately configured to perform actions or processing processes performed by the first access point in the foregoing method. As shown in FIG. 12, the data transmission apparatus 200 may include a detection unit 210 and a transceiver unit 220.

The detection unit 210 is configured to detect a channel.

The transceiver unit 220 is configured to: if the detection unit 210 detects an idle first channel, send a first trigger frame to at least one second access point, where the first trigger frame is used to trigger the at least one second access point to send data on the first channel after a first preset time period elapses.

In an optional embodiment, the apparatus and the at least one second access point belong to a same access point group.

In an optional embodiment, the first trigger frame includes a first bit field, and a bit in the first bit field is used to identify the access point group.

In an optional embodiment, a receiving address (RA) field of the first trigger frame includes the first bit field, and the bit in the first bit field is used to indicate a media access control (MAC) address of the access point group.

In an optional embodiment, an association identifier (AID) field of the first trigger frame includes the first bit field, and the bit in the first bit field is used to indicate a group identifier of the access point group.

In an optional embodiment, the AID field of the first trigger frame includes at least one second bit field, and a bit in each of the at least one second bit field is used to indicate an identifier of a second access point.

In an optional embodiment, the first trigger frame includes a fourth bit field, and a bit in the fourth bit field is used to indicate a type of the first trigger frame.

In an optional embodiment, the first trigger frame further includes a fifth bit field, a bit in the fifth bit field is used to indicate a first identifier of data to be transmitted. The transceiver unit 220 is further configured to send data on the first channel based on the first identifier after the first preset time period elapses.

In an optional embodiment, the first trigger frame is a clear to send (CTS) frame, and an RA field of the first trigger frame includes the fifth bit field.

In an optional embodiment, a common info field or a user info field of the first trigger frame includes the fifth bit field.

In an optional embodiment, the transceiver unit 220 is further configured to: send the first trigger frame to a third access point, where the first trigger frame includes a third bit field, a bit in the third bit field is used to indicate a backoff time period of the third access point, and the transceiver unit is configured to send data with the at least one second access point on the first channel during the backoff time period.

In an optional embodiment, the detection unit 210 is further configured to: after the transceiver unit 220 sends the first trigger frame to at least one second access point, detect a channel. The transceiver unit 220 is further configured to: if the detection unit 210 detects an idle second channel, send a second trigger frame to the fourth access point on the second channel, where the second trigger frame is used to trigger a fourth access point to send data on the second channel after a second preset time period elapses.

It should be understood that, for a specific process in which units in the apparatus 200 perform the foregoing corresponding steps, refer to descriptions in the foregoing method embodiments. For brevity, details are not described herein again.

Figure 13:
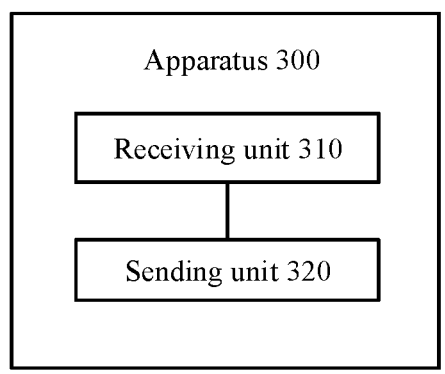
FIG. 13 is a schematic diagram of another data transmission apparatus according to an embodiment of this application.

FIG. 13 is a schematic block diagram of a data transmission apparatus 300 according to an embodiment of this application. The apparatus 300 may correspond to the second access point described in the foregoing method, or may correspond to a chip or a component of the second access point. In addition, each module or unit in the apparatus 300 may be separately configured to perform actions or processing processes performed by the second access point in the foregoing method. As shown in FIG. 13, the data transmission apparatus 300 may include a receiving unit 310 and a sending unit 320.

The receiving unit 310 is configured to receive a first trigger frame sent by a first access point, where the first trigger frame is used to trigger the second access point to send data on a first channel after a first preset time period elapses.

The sending unit 320 is configured to send data on the first channel based on the first trigger frame after the first preset time period elapses.

In an optional embodiment, the first access point and the apparatus belong to a same access point group.

In an optional embodiment, the first trigger frame includes a first bit field, and a bit in the first bit field is used to identify the access point group. The apparatus further includes:

a determining unit, configured to determine, based on the bit in the first bit field in the first trigger frame, that the second access point and the first access point belong to the same access point group.

The sending unit 320 is specifically configured to send data on the first channel after the first preset time period elapses.

In an optional embodiment, a receiving address (RA) field of the first trigger frame includes the first bit field, and the bit in the first bit field is used to indicate a MAC address of the access point group.

In an optional embodiment, an association identifier (AID) field of the first trigger frame includes the first bit field, and the bit in the first bit field is used to indicate a group identifier of the access point group.

In an optional embodiment, the AID field of the first trigger frame includes a second bit field, and a bit in the second bit field is used to indicate an identifier of the apparatus. The determining unit is further configured to: before the sending unit 320 sends data on the first channel based on the first trigger frame after the first preset time period elapses, determine, based on the bit in the second bit field, to send data on the first channel.

In an optional embodiment, the first trigger frame includes a fourth bit field, and a bit in the fourth bit field is used to indicate a type of the first trigger frame. The determining unit is further configured to determine, based on the bit in the fourth bit field, that the first trigger frame is used to trigger the second access point to send data on the first channel after the first preset time period elapses.

In an optional embodiment, the first trigger frame includes a fifth bit field, and a bit in the fifth bit field is used to indicate a first identifier of data to be transmitted by the first access point. The determining unit is further configured to determine, based on the bit in the fifth bit field, a second identifier of data to be transmitted by the second access point, where a correspondence exists between the first identifier and the second identifier.

The sending unit 320 is specifically configured to send the data corresponding to the second identifier on the first channel after the first preset time period elapses.

In an optional embodiment, the first trigger frame is a clear to send (CTS) frame, and the RA field of the first trigger frame includes the fifth bit field.

In an optional embodiment, a common info field or a user info field of the first trigger frame includes the fifth bit field.

It should be understood that, for a specific process in which units in the apparatus 300 perform the foregoing corresponding steps, refer to descriptions in the foregoing method embodiments. For brevity, details are not described herein again.

The apparatus 200 in the foregoing solutions has a function of implementing corresponding steps performed by the first access point in the foregoing method, and the apparatus 300 in the foregoing solutions has a function of implementing corresponding steps performed by the second access point in the foregoing method. The functions may be implemented by hardware or software, or may be implemented by hardware executing corresponding software. The hardware or the software includes one or more modules corresponding to the foregoing functions. For example, the sending unit may be replaced with a communication interface, the receiving unit may be replaced with a communication interface, and another unit, for example, the determining unit, may be replaced with a processor, to separately perform a sending operation, a receiving operation, and a related processing operation in the method embodiments. In this embodiment of this application, a communication interface of an apparatus is used by the apparatus to communicate with another device. For example, the communication interface may be a transmitter, a receiver, a transceiver, a circuit, a bus, a module, a pin, or another type of communication interface. This is not limited in this embodiment of this application.

In a specific implementation process, the processor may be configured to perform, for example, but not limited to, baseband related processing, and the communication interface may be configured to perform, for example, but not limited to, information exchange. The foregoing components may be separately disposed on chips independent of each other, or at least some or all of the components may be disposed on one chip. For example, the processor may further be classified into an analog baseband processor and a digital baseband processor. The analog baseband processor and the communication interface may be integrated on a same chip, and the digital baseband processor may be disposed on an independent chip. With continuous development of integrated circuit technologies, an increasing quantity of components may be integrated on one chip. For example, the digital baseband processor and a plurality of application processors (for example, but not limited to a graphics processing unit and a multimedia processor) may be integrated on one chip. Such chip may be referred to as a system on chip (system on chip, SOC). Whether to separately dispose the components on different chips or integrate the components on one or more chips depends on a specific product design requirement. Specific implementation forms of the foregoing components are not limited in this embodiment of this application.

Figure 14:
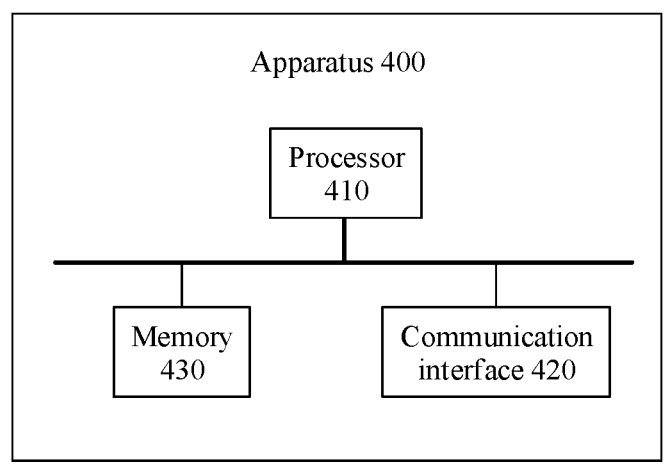
FIG. 14 is a schematic diagram of still another data transmission apparatus according to an embodiment of this application.

It may be understood that the processor in the foregoing embodiments may execute program instructions by using a hardware platform having a processor and a communication interface, to separately implement a function of the processor in any design in the foregoing embodiments of this application. Based on this, as shown in FIG. 14, an embodiment of this application provides a schematic block diagram of a data transmission apparatus 400. The apparatus 400 includes a processor 410, a communication interface 420, and a memory 430. The processor 410, the communication interface 420, and the memory 430 are coupled to communicate with each other. The memory 430 is configured to store instructions. The processor 410 is configured to execute the instructions stored in the memory 430, to control the communication interface 420 to send a signal and/or receive a signal. Coupling in this embodiment of this application may be indirect coupling or a communication connection between apparatuses, units, or modules in an electrical form, a mechanical form, or another form, and is used for information exchange between the apparatuses, the units, or the modules.

In a possible implementation, if the apparatus 400 is a first access point, the processor 410 is configured to detect a channel. The communication interface 420 is configured to: if the processor detects an idle first channel, send a first trigger frame to at least one second access point, where the first trigger frame is used to trigger the at least one second access point to send data on the first channel after a first preset time period elapses.

In a possible implementation, if the apparatus 400 is a second access point, the communication interface 420 is configured to receive the first trigger frame sent by the first access point, where the first trigger frame is used to trigger the second access point to send data on the first channel after the first preset time period elapses; and send data on the first channel based on the first trigger frame after the first preset time period elapses.

It should be understood that the apparatus in FIG. 12 or the apparatus in FIG. 13 in this embodiment of this application may be implemented by using the apparatus 400 in FIG. 14, and may be configured to perform steps and/or procedures corresponding to the first access point and the second access point in the foregoing method embodiments.

It may be understood that the methods, the procedures, the operations, or the steps in the designs described in the embodiments of this application can be implemented in a one-to-one correspondence manner by using computer software, electronic hardware, or a combination of computer software and electronic hardware. Whether these functions are performed in a hardware manner or a software manner depends on specific application and a design constraint of the technical solutions. For example, in consideration of aspects such as good universality, low costs, and decoupling between software and hardware, these functions may be implemented by executing program instructions. For another example, in consideration of aspects such as system performance and reliability, these functions may be implemented by using a private circuit. A person of ordinary skill in the art may implement the described functions by using different methods for each particular application. This is not limited herein.

According to the method provided in the embodiments of this application, this application further provides a computer program product. The computer program product includes computer program code. When the computer program code is run on a computer, the computer performs the method in the foregoing embodiments. The embodiments in this application may also be combined with each other.

According to the method provided in the embodiments of this application, this application further provides a computer-readable medium. The computer-readable medium stores program code. When the program code is run on a computer, the computer performs the method in the foregoing embodiments.

In the embodiments of this application, it should be noted that the foregoing method embodiments in the embodiments of this application may be applied to a processor, or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (digital signal processor, DSP), an application-specific integrated circuit (application-specific integrated circuit, ASIC), a field programmable gate array (Field programmable gate array, FPGA) or another programmable logic device, a discrete gate or transistor logic device, or a discrete hardware component. The processor may implement or perform the methods, the steps, and the logical block diagrams that are disclosed in the embodiments of this application. The general-purpose processor may be a microprocessor, any conventional processor, or the like.

It may be understood that the memory in the embodiments of this application may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The terms "first", "second", and the like in this application are merely used to distinguish different objects, and "first" and "second" do not limit an actual sequence or functions of objects modified by "first" and "second". Any embodiment or design solution described as "example", "for example", "such as", "optionally", or "in some implementations" in this application should not be construed as being more advantageous than another embodiment or design. Specifically, using these words is intended to present a related concept in detail.

Names may be assigned to various objects that may appear in this application, for example, various messages/information/devices/network elements/systems/apparatuses/operations. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

All or some of the foregoing embodiments may be implemented by using software, hardware, firmware, or any combination thereof. When software is used to implement the embodiments, all or some of the embodiments may be implemented in a form of a computer program product. The computer program product may include one or more computer instructions. When the computer program instructions are loaded and executed on a computer, all or some of the procedures or functions according to the embodiments of this application are generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (solid state drive, SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments. Details are not described herein again. In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A data transmission method, comprising:
    detecting, by a first access point, an idle first channel; and
    sending, by the first access point, a first trigger frame to at least one second access point, wherein the first trigger frame triggers the at least one second access point to send data on the idle first channel after a first preset time period elapses, wherein the first trigger frame comprises an association identifier (AID) field for indicating an identifier of a second access point, and wherein the AID field comprises at least one second bit field, and a bit in each of the at least one second bit field indicates the identifier of the second access point.

2. The method according to claim 1, wherein the first access point and the at least one second access point are comprised in a same access point group.

3. The method according to claim 2, wherein the first trigger frame comprises a first bit field, and a bit in the first bit field identifies the same access point group that the first access point and the at least one second access point are comprised in.

4. The method according to claim 1, wherein the method further comprises:
sending, by the first access point, the first trigger frame to a third access point, wherein the first trigger frame comprises a third bit field, a bit in the third bit field indicates a backoff time period of the third access point, and the first access point and the at least one second access point send data on the idle first channel during the backoff time period.

5. The method according to claim 1, wherein the method further comprises:
after sending the first trigger frame to the at least one second access point, detecting, by the first access point, an idle second channel; and
sending, by the first access point, a second trigger frame to a fourth access point on the idle second channel, wherein the second trigger frame triggers the fourth access point to send data on the idle second channel after a second preset time period elapses.

6. A data transmission method, comprising:
receiving, by a second access point, a first trigger frame sent by a first access point, wherein the first trigger frame triggers the second access point to send data on a first channel after a first preset time period elapses, wherein the first trigger frame comprises an association identifier (AID) field for indicating an identifier of a second access point, and wherein the AID field comprises at least one second bit field, and a bit in each of the at least one second bit field indicates the identifier of the second access point; and
sending, by the second access point, data on the first channel based on the first trigger frame after the first preset time period elapses.

7. The method according to claim 6, wherein the first access point and the second access point are comprised in a same access point group.

8. The method according to claim 7, wherein the first trigger frame comprises a first bit field, and a bit in the first bit field identifies the same access point group that the first access point and the second access point are comprised in; and wherein the method further comprises:
determining, by the second access point based on the bit in the first bit field in the first trigger frame, that the second access point and the first access point are comprised in the same access point group.

9. The method according to claim 6, wherein the method comprises:
before sending the data on the first channel, determining, by the second access point based on the bit in the second bit field, to send data on the first channel.

10. A data transmission apparatus, comprising:
at least one processor; and
one or more memories coupled to the at least one processor and storing programming instructions for execution by the at least one processor to perform operations comprising:
detecting an idle first channel; and
sending a first trigger frame to at least one second access point, wherein the first trigger frame triggers the at least one second access point to send data on the idle first channel after a first preset time period elapses, wherein the first trigger frame comprises an association identifier (AID) field for indicating an identifier of a second access point, and wherein the AID field comprises at least one second bit field, and a bit in each of the at least one second bit field indicates the identifier of the second access point.

11. The apparatus according to claim 10, wherein the apparatus and the at least one second access point are comprised in a same access point group.

12. The apparatus according to claim 11, wherein the first trigger frame comprises a first bit field, and a bit in the first bit field identifies the same access point group that the apparatus and the at least one second access point are comprised in.

13. The apparatus according to claim 10, wherein the operations further comprising:
sending the first trigger frame to a third access point, wherein the first trigger frame comprises a third bit field, a bit in the third bit field indicates a backoff time period of the third access point, and the apparatus and the at least one second access point send data on the idle first channel during the backoff time period.

14. The apparatus according to claim 10, wherein the operations further comprising:
after sending the first trigger frame to the at least one second access point, detecting an idle second channel; and
sending a second trigger frame to a fourth access point on the idle second channel, wherein the second trigger frame triggers the fourth access point to send data on the idle second channel after a second preset time period elapses.

* * * * *